(12) United States Patent
Dole et al.

(10) Patent No.: US 8,402,920 B2
(45) Date of Patent: Mar. 26, 2013

(54) SYSTEM AND METHOD FOR CLEANING TEATS OF A MILK-PRODUCING ANIMAL

(75) Inventors: Kevin Dole, Longwood, FL (US);
Stanley B. Herbin, Oviedo, FL (US)

(73) Assignee: Alpha Technology U.S.A. Corporation, Longwood, FL (US)

( * ) Notice: Subject to any disclaimer, the term of this patent is extended or adjusted under 35 U.S.C. 154(b) by 103 days.

(21) Appl. No.: 12/883,359

(22) Filed: Sep. 16, 2010

(65) Prior Publication Data
US 2012/0067288 A1 Mar. 22, 2012

(51) Int. Cl.
*A01J 7/04* (2006.01)
(52) U.S. Cl. .................................... 119/14.18; 119/664
(58) Field of Classification Search ............... 119/14.18, 119/652, 664, 670; 424/661
See application file for complete search history.

(56) References Cited

U.S. PATENT DOCUMENTS

| | | | | |
|---|---|---|---|---|
| 3,648,696 | A * | 3/1972 | Keith | 604/310 |
| 3,713,423 | A * | 1/1973 | Sparr, Sr. | 119/670 |
| 4,305,346 | A * | 12/1981 | Sparr, Sr. | 119/670 |
| 5,211,132 | A * | 5/1993 | Farina et al. | 119/664 |
| 5,235,937 | A * | 8/1993 | Farina et al. | 119/664 |
| 5,383,423 | A | 1/1995 | van der Lely | |
| 5,641,498 | A | 6/1997 | Loosemore | |
| 6,123,966 | A | 9/2000 | Kross | |
| 6,321,688 | B1 * | 11/2001 | Eriksson | 119/663 |
| 6,325,021 | B1 * | 12/2001 | Farina | 119/664 |
| 6,343,566 | B1 * | 2/2002 | Eriksson | 119/14.01 |
| 6,394,038 | B1 * | 5/2002 | Eriksson | 119/609 |
| 6,524,624 | B1 | 2/2003 | Morelli et al. | |
| 6,550,420 | B1 * | 4/2003 | Bjork | 119/14.47 |
| 6,591,784 | B1 * | 7/2003 | Eriksson | 119/670 |
| 6,752,102 | B2 * | 6/2004 | Dahl et al. | 119/14.47 |
| 7,165,510 | B2 * | 1/2007 | Hakes | 119/664 |
| 7,178,480 | B2 * | 2/2007 | Dahl et al. | 119/14.47 |
| RE41,279 | E | 4/2010 | McSherry et al. | |
| 7,882,802 | B2 * | 2/2011 | Van Den Berg et al. | 119/14.08 |
| 2007/0175405 | A1 | 8/2007 | Vecchia | |
| 2009/0084324 | A1 * | 4/2009 | Hiley | 119/652 |

FOREIGN PATENT DOCUMENTS

| | | |
|---|---|---|
| EP | 0 399 132 | 11/1990 |
| EP | 399132 A1 * | 11/1990 |
| FR | 2559351 A1 * | 8/1985 |
| WO | WO 99/04623 | 2/1999 |
| WO | WO 99/05904 | 2/1999 |
| WO | WO 00/47041 | 8/2000 |
| WO | WO 2004/034775 | 4/2004 |

OTHER PUBLICATIONS

European Search Report, Jan. 17, 2012.
Neijenhuis, F. et al, "Relationship Between Teat-End Callosity and Occurrence of Clinical Mastitis," J. Dairy Sci., 2001, pp. 2664-2672, vol. 84, No. 12, Am. Dairy Sci. Assoc.
Dube, B. et al, "Genetic Analysis of Somatic Cell Score and Udder Type Traits in South African Holstein Cows," Sth. Afric. Journ. of Anim. Sci., 2008, pp. 1-11, vol. 38, No. 1.

* cited by examiner

*Primary Examiner* — Yvonne Abbott
(74) *Attorney, Agent, or Firm* — Robert L. Wolter, Esq.; Beusse Wolter Sanks Mora & Maire, P.A.

(57) ABSTRACT

An embodiment of the invention is directed to a system for cleaning teats of multiple milk-producing animals, wherein the animals are housed in a parlor area and the teats are cleaned or disinfected before a milking operation is started. The system comprises an aqueous chlorine dioxide disinfectant solution source provided at the parlor area; and, a hand-held applicator having a housing volume within which one or more scrubbing elements are positioned for engaging a teat of the milk-producing animal having been inserted in the volume for cleaning. The hand-held applicator is remotely operable relative to the disinfectant solution source.

22 Claims, 8 Drawing Sheets

SYSTEM AND METHOD FOR CLEANING TEATS OF A MILK-PRODUCING ANIMAL

BACKGROUND OF THE INVENTION

Embodiments of the present invention relate to systems and methods that are used for cleaning teats of milk producing animals. More specifically, the invention pertains to those systems that utilize disinfectant applicators that are remotely operable, relative to a supply of disinfectant solution, for cleaning the teats of a milk-producing animal.

A variety of different methods and systems are presently available for cleaning teats from animals that produce milk. Several methods incorporate or utilize manual labor for cleaning the teats including the immersion of the teat in a dipping cup that includes a cleaning or disinfectant solution for a period of not less than one minute. Typically such cleaning solutions are iodine-based solutions or may include 5,000 ppm of chlorine dioxide, and have a thick syrup-like consistency and/or contain conditioning additives. A worker inserts the teat in the dipping cup to immerse the teat in the disinfectant. This is done sequentially for all teats on the animal. Because the solutions are thicker or contain one or more conditioning compounds, the solutions leave a residue (sometimes a tacky residue) that must be removed from the teat before milking. Accordingly, a worker uses a towel to dry each teat in preparation for milking. Such methods that incorporate these manual steps may be impractical for larger dairies, which may include thousands of cows. In addition, such method may be slower than systems that may include remotely operable solution applicators.

Systems are available that utilize rotating brushes in combination with a cleaning solution to clean teats. One such system is disclosed in U.S. patent application Ser. No. 11/490,072 which has been sold and distributed by Puli-Sistem S.r.l. Such systems may include applicators having three rotating brushes, two of which rotate to scrub/clean a base of the teat, and a third brush which is arranged to scrub/clean a tip of the teat. The applicators are in fluid communication with a disinfectant source, which is supplied to the applicators as the brushes are rotating and scrubbing the teats. The applicators are remotely operated relative to the solution source.

However, such systems do not account for different teat lengths. As a departure from breeders of dairy cattle in foreign countries, American breeders and bull studs have concluded that shorter teats present many advantages to the traditional long-teated cow. Shorter teats are more functional for American dairies and milking practices, are less apt to be stepped on or injured and are less inclined to develop infections (mastitis). From multiple sources including scientific journals and compendia of data listing typical traits of dairy cows, it has been discovered that the teats of American dairy cows have incrementally shortened to an average length of 1.8"-1.9". At current cow teat lengths, prior art, including the above-reference Puli-Sistem cleaning system, contains a teat end brush that is too far away from the teat to adequately clean most cows' teats of American bred cows.

In addition, the brushes typically include bristles that are polypropylene filament bristles and are rotated at 1,000 rpm. The polypropylene bristles are rotated at such high speed cause discomfort to the animal during cleaning, which may adversely affect milk production. Current systems also fail to adequately seal moving parts from debris such as dirt, sand, etc., that is removed from the teats. Lubricants are used on the gears and the interface between the gears and brushes. The debris combined with the lubricant form an abrasive amalgam that prematurely degrades the components of the applicator. In addition, the excessive speed causes premature wear on components such as gears, bushings and the like.

Other problems associated with rotating brush systems include the disinfectant solutions, which often do not account for varying water qualities at different farm locations. Prior art systems that utilized an aqueous chlorine dioxide disinfectant solution, delivered the $ClO_2$ disinfectant in a concentration of about 75 ppm. While this concentration may be effective for cleaning, impurities in water sources can react with the $ClO_2$ dissipating the concentration of this active ingredient and the effectiveness of the solution. Moreover, these solutions contained conditioning additives that suffered from the above-described problems.

In addition, current solution delivery systems often do not provide a consistent concentration of the active chemical of the disinfectant solution to the rotating brushes. More specifically, the active chemical is supplied to the brushes in pulses interspersed with pulses of water without solution. Because each teat is an independent cleaning and disinfecting event, the lack of disinfectant on any one teat is considered an inadequate cleaning. Accordingly, a need exists for providing a system or method for cleaning animal teats that supplies disinfectant solutions to an applicator in a consistent concentration and in a manner that does not create discomfort prior to milking operations; and, the concentration of the active chemical of the solution is provided at such a concentration to account for varying water qualities at different milking facilities. Also, such a system preferably may account for the different teat lengths of animals.

BRIEF DESCRIPTION OF THE INVENTION

An embodiment of the invention is directed to a system for cleaning teats of milk-producing animals, wherein the animals are housed in a parlor area and the teats are cleaned or disinfected before a milking operation is started. The system comprises an aqueous chlorine dioxide disinfectant solution source provided at the parlor area; and, a hand-held applicator having a housing volume within which one or more scrubbing elements are positioned for engaging a teat of the milk-producing animal having been inserted in the volume for cleaning. The hand-held applicator is remotely operable relative to the disinfectant solution source.

A delivery station is provided in fluid communication with the hand-held applicator and the disinfectant solution source, for delivering the disinfectant solution to the housing volume of the hand-held applicator with a predetermined concentration of chlorine dioxide. In addition, a controller is provided in electrical communication with the hand-held applicator and the delivery station. The controller is configured to initiate the actuation of the scrubbing elements and delivery of the disinfectant solution to the hand-held applicator as the scrubbing elements are actuated, wherein the disinfectant solution is delivered to the hand-held applicator with the predetermined concentration. The disinfectant preferably has a viscosity and vapor pressure that is substantially equal to that of water and does not include any compounds or materials such as conditioners, humectants, moisturizes, etc., that may increase the viscosity or lower the vapor pressure of the solution. Accordingly, the teat may be partially dried after a cleaning operation so that some residual amount of the disinfectant solution remains on a teat allowing the teat to dry by sublimation of the cleaning solution. This allows the disinfectant to remain in contact with the teat for a more effective sanitation of the teat.

In a preferred embodiment, the disinfectant solution is delivered to the application with a concentration of chlorine dioxide being about 100 ppm to about 200 ppm by volume. The predetermined concentration of the chlorine dioxide delivered to the hand-held applicator is preferably 150 ppm.

In a preferred embodiment, the scrubbing elements include at least two scrubbing elements including a first brush positioned in the housing for engaging an end of the teat through which milk is released, and a second brush that is positioned in the housing to engage an area of the teat above the end of the teat. The first and second brushes comprise an array of nylon fibers and the brushes are rotated at a speed between about 400 rpm to about 700 rpm, and preferably about 500 rpm. In a preferred embodiment, the first brush includes an array of bristles including a first set of bristles having a first length and a second set of bristles that have a second length that is longer than the first length to engage the ends of teats of different lengths.

The invention also includes a method for cleaning teats of multiple milk-producing animals, wherein the animals are housed in a parlor area and the teats are cleaned or disinfected before the milking operation is started. The method comprises providing a source of an aqueous chlorine dioxide disinfectant solution at a location within or at the parlor. The method also includes delivering, for a first predetermined time duration, the aqueous chlorine dioxide disinfectant solution containing a predetermined concentration of preferably about 150 ppm of chlorine dioxide by volume to a housing of a hand-held applicator that has a teat inserted within a volume of the housing. As described above the applicator has movable scrubbing elements in the housing element. The method further comprises simultaneously actuating the scrubbing elements for cleaning the teats in the presence of the solution for the predetermined time duration, wherein the applicator is remotely operable relative to the solution source. The method may also comprise actuating the scrubbing elements for a second time duration, while solution is not delivered to the applicator in order to dry the teats. In a preferred embodiment, the teats are only partially dried so that residual disinfectant solution may remain on the teats. Because the solution does not contain the above-mentioned conditioners, humectants, moisturizers etc., the residual solution will adequately sublime or evaporate from the teats prior to attachment of a milking machine, thereby allowing some residual disinfectant to remain in contact with the teat for longer periods to time compared to the prior art solutions.

DETAILED DESCRIPTION OF THE INVENTION

A more particular description of the invention briefly described above will be rendered by reference to specific embodiments thereof that are illustrated in the appended drawings. Understanding that these drawings depict only typical embodiments of the invention and are not therefore to be considered to be limiting of its scope, the invention will be described and explained.

Figure 1:
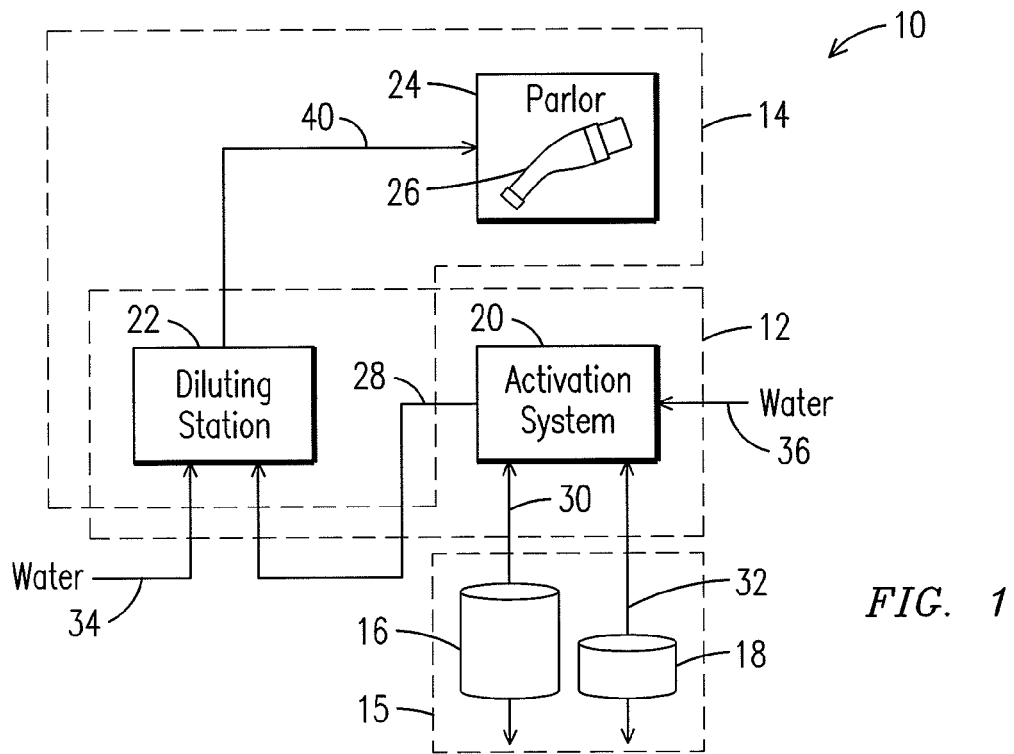
FIG. 1 is a schematic diagram of the system for cleaning teats.

With respect to FIG. 1, there is shown schematically a system 10 for cleaning teats of a milk-producing animal. As shown, the system 10 is configured to deliver an aqueous disinfectant solution to one or more solution applicators 26 positioned in a milking parlor 24 and to the teats of a milk producing animal. The system 10 generally includes a chemical mixing/diluting station 12 at which a concentrated disinfectant is generated by mixing a starter chemical solution with an activator. As disinfectant source is provided including a container 16 of sodium chlorite and a container 18 of the acid activator for generating the concentrated disinfectant, which is diluted as station 12 for delivery to the milking parlor 24. Accordingly, FIG. 1 references a delivery section 14 that includes the solution applicator 26 and may also include components of the mixing/diluting station 12.

While an embodiment illustrates and describes applicators that include a housing attached to a handle, and rotating brushes within the housing to clean teats in the presence of a disinfectant solution, the invention is not limited to the use of rotating brushes. The invention may cover applicators 26 that include other applicator mechanisms that operate remotely relative to a source of disinfectant delivered to the applicator mechanism, which contacts teats and move relative to the teats to scrub and clean the teats in the presence of the disinfectant solution.

The Disinfectant Solution

The disinfectant solution that is applied to the teats is preferably an aqueous chlorine dioxide solution with the concentration of the chlorine dioxide being in the range of about 50 ppm to about 200 ppm. In a preferred embodiment, the concentration of chlorine dioxide is about 125 ppm to about 175 ppm, and preferably about 150 ppm. In addition, the solution does not contain additives such as conditioners, humectants, moisturizers, etc. that may thicken the solution, or increase the viscosity or decrease the vapor pressure of the solution. Accordingly, the solution has a viscosity and/or vapor pressure that is substantially equal to that of water. The estimated vapor pressure of 200 ppm acidified chlorine dioxide solution with a pH 3.00 at 25° C. is about 23.8 mmHg±1 mmHg. The estimated viscosity of the same solution at 20° C. is about 1.002 mPa±0.001 mPa. After cleaning a teat with this solution, the teat may be partially dried so that some residual disinfectant remains on the teat for sublimation or evaporation. This allows the disinfectant to remain in contact with the teat for longer periods of time as compared to prior art solutions. As explained in more detail below, the applicators 26 having rotating brushes mounted within a brush housing that scrub teats while the aqueous disinfectant solution is delivered within a volume of the brush housing and applied to the teats.

Figure 10:
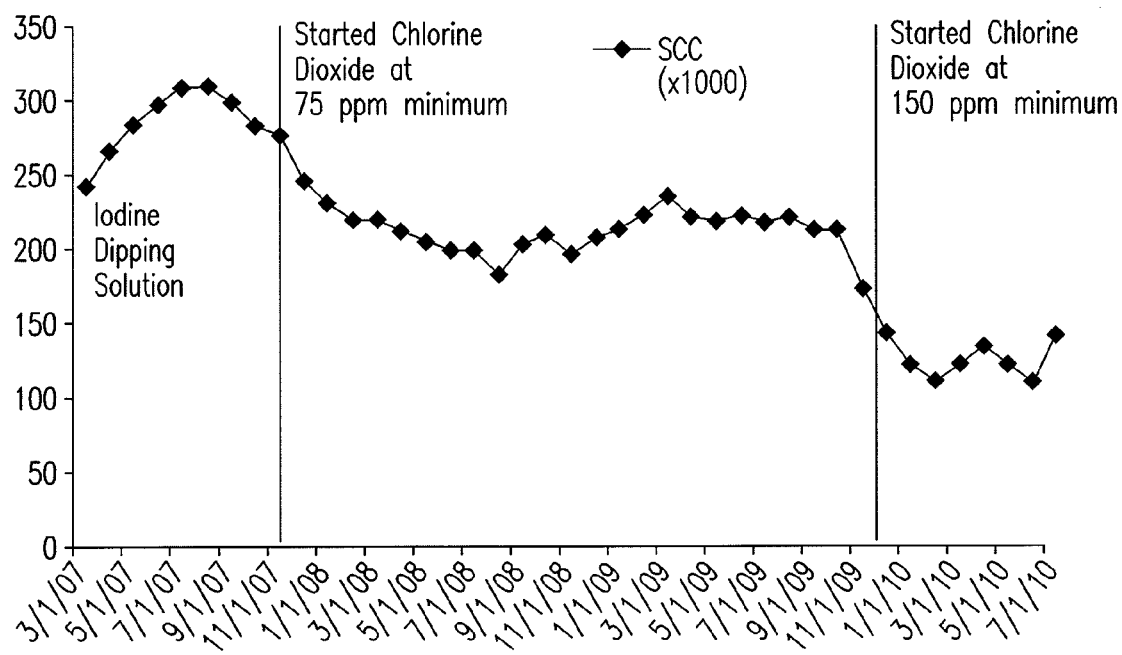
FIG. 10 is a graph showing somatic cell counts using a disinfectant solution comprising a 150 ppm chlorine dioxide solution compared to prior art solutions.

The graph shown in FIG. 10 illustrates somatic cell count test results of the experimental use of the above-described disinfectant with a concentration of approximately 150 ppm of chlorine dioxide used with the below-described teat scrubbing unit having rotating brushes with nylon bristles, and the brushes were rotated at about 500 rpm. Somatic cell count is an indicator of the quality of milk produced. The number of somatic cells increases in response to pathogenic bacteria that may cause mastitis. Somatic cell count is quantified per milliliter.

The somatic cell count results for the disinfectant solution having a concentration of 150 ppm of chlorine dioxide are provided in comparison to a disinfectant solution having a concentration of about 75 ppm of chlorine dioxide. The less concentrated solution also contained one or more additives such as a moisturizer. In addition, the 75 ppm solution was used with a prior art scrubbing unit that had rotating brushes with polypropylene filament bristles being rotated at about 1,000 rpm.

Data is also provided relative to somatic cell count using an iodine dipping solution for cleaning teats and wiping the teats dry with a towel. The somatic cell counts were taken at the same dairy at the beginning of every other month, which was and is the normal procedure for the dairy at which the experimental use of the inventive solution was used. As shown in the graph, the less concentrated solution of 75 ppm of chlorine dioxide produced somatic cell counts of about 200,000/ml to about 275,000/ml over about a two year period. When the experimentation of the inventive solution having 150 ppm of chlorine dioxide began, somatic cell count dropped below 150,000/ml thereby indicating the inventive disinfectant solution has a direct effect on pathogens that may cause mastitis.

System for Applying Solution

The aqueous chlorine dioxide disinfectant solution is generated by combining chlorite ($ClO2^-$), in the form of a metal salt such as sodium chlorite, with an acidic activator. Accordingly in reference to FIG. 1, a disinfectant source 15 is provided and includes in a container 16 of sodium chlorite and a container 18 of the acid activator. In an embodiment of the invention, the acid activator in tank 18 is citric acid and preferably is a 50% citric acid solution that is combined with a 2% to 5% aqueous sodium chlorite solution in container 16, and preferably a 3% to 4% sodium chlorite solution, which contains about 32,000 ppm of sodium chlorite.

The tanks 16 and 18 are in fluid communication, via lines 30 and 32 respectively, with a chemical activation system 20. In addition, a water line 36 feeds water from a water source (not shown) to mix the sodium chlorite and acid activator (citric acid) with water. The activation system 20 referred herein operates generally on a venturi principal with the water flow from water line 36 generating suction to draw the sodium chlorite and the acid activator into the activation system 20 in mixing relationship with water. The sodium chlorite is mixed with the acid activator and water to generate an aqueous chlorine dioxide solution preferably having a concentration of about 6,400 ppm chlorine dioxide, which is further diluted at the diluting station 22, explained below in more detail.

An example of such an activation system is the Automated Activation Non-Electric (AANE) system that can be purchased from Bio-Cide International, Inc. located in Norman, Okla. The activation system 20 may operate using a float mechanism to control the volume of solution mixed. More specifically, when the volume of solution mixed in the activation system 20 drops to a predetermined level or volume, a valve control to the water line 36 is opened to initiate water flow so that sodium chlorite and acid activator is drawn into the activation system 20. Once the mixed solution reaches a predetermined volume, the float mechanism closes the appropriate water flow control valve.

The activation system 20 and dilution station 22 are in fluid communication via line 28 for delivery of the aqueous chlorine dioxide to the dilution station 22. As shown schematically in FIG. 2, the dilution station 22 includes a pump 42 that pumps the aqueous chlorine dioxide solution from the activation system 20 to the dilution station 22. In addition, water is directed to the dilution station 22 via water line 34 and mixed with the chlorine dioxide from the activation system 20. More specifically, the aqueous solution of chlorine dioxide and water are passed through a static mixer 28 to dilute the aqueous solution of chlorine dioxide to a predetermined concentration and produce a consistent flow of cleaning solution to the applicator applicators 26 in the milking parlor 24. The disinfectant solution is delivered to the applicator 26 via line 40.

Figure 3:
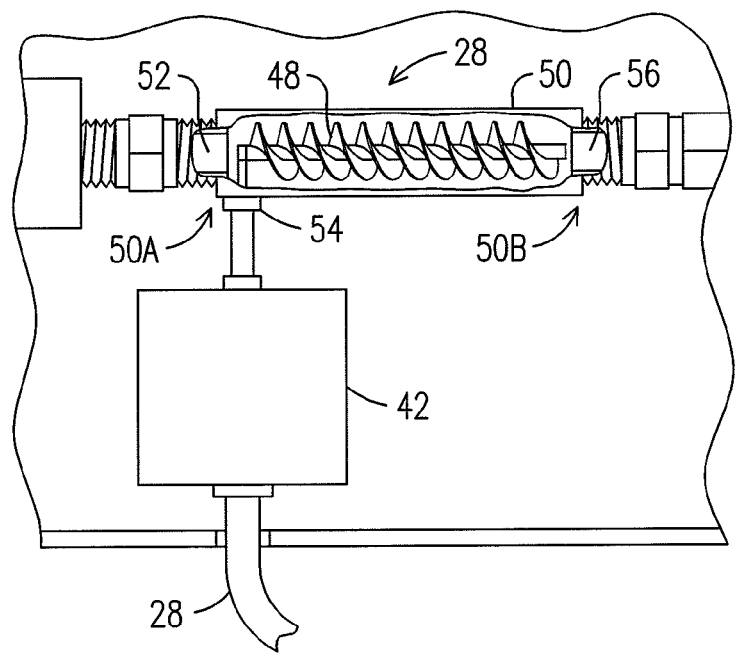
FIG. 3 is sectional view of a static mixer incorporated in the dilution station.

As shown in FIG. 3, the static mixer 28 includes a mixer element 48 that has a generally helical configuration and is positioned within a housing 50. While reference is made to the helical configuration other designs known to those skilled in the art may be used. The mixing element 48 may be composed of a chemically inert material, such as stainless steel or polypropylene, relative to the chemicals used to make the disinfectant. Mixing elements and/or static mixers can be purchased from Sulzer Ltd., which is headquartered in Switzerland. The housing 50 includes a water inlet port 52 and solution inlet port 54 disposed at a first end 50A of the housing. An outlet port 56 is disposed at the opposite or second end 50B of the housing 50 for the diluted aqueous chlorine dioxide, or disinfectant to exit the static mixer 28.

The helical configuration of the mixer element 48 allows for adequate mixing of the concentrated chlorine dioxide with water to provide a consistent flow of disinfectant to an applicator 26 in the parlor 24. Prior art systems not using a static mixer often suffer from disinfectant solution being provided to an applicator in pulses such that disinfectant was or is not consistently applied to teats, resulting in no disinfectant applied to some teats during a cleaning/disinfecting operation. The incorporation of the static mixer 28 solves these problems.

Figure 2:
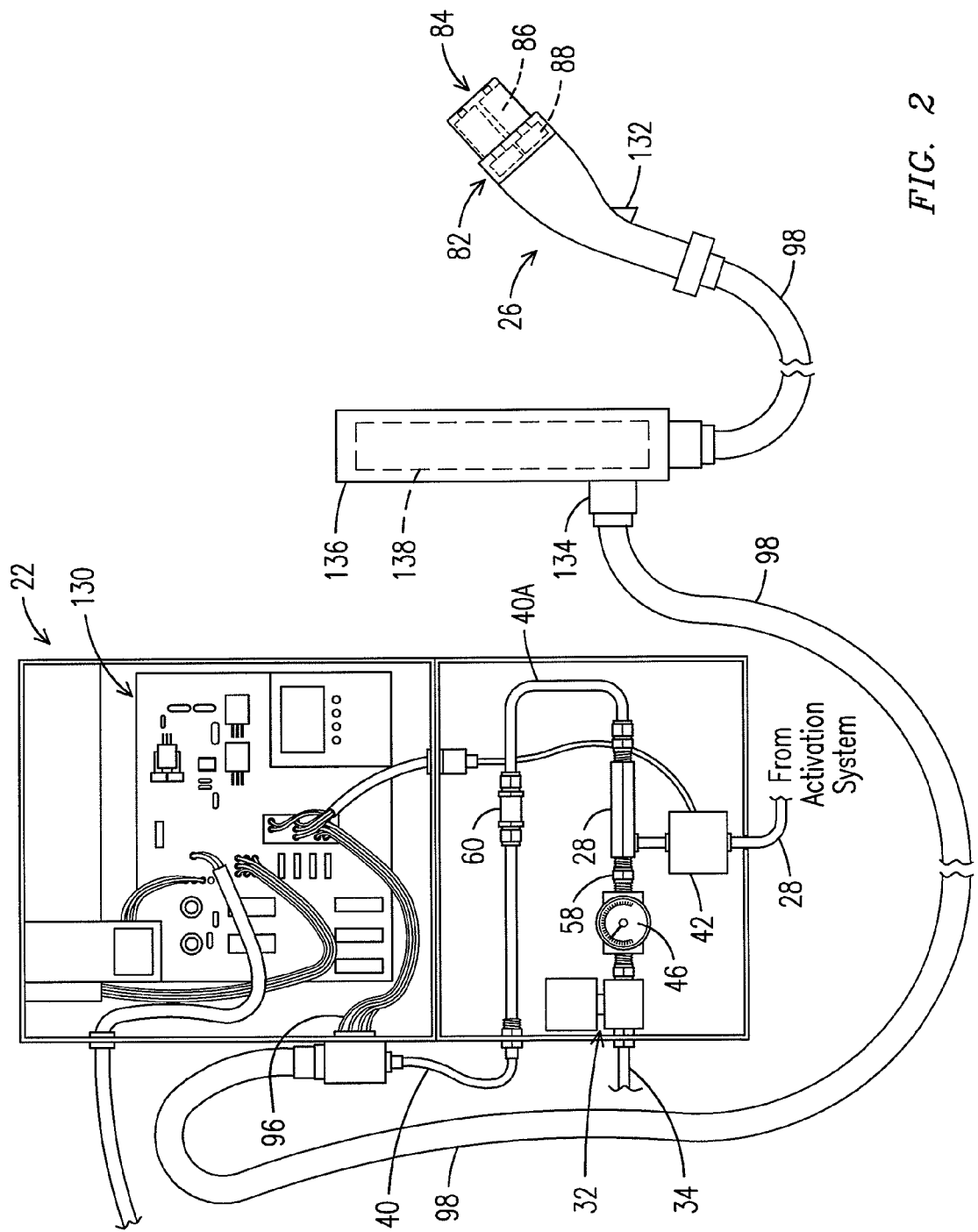
FIG. 2 is a schematic illustration of the dilution station with logic board, applicator and motor for driving an applicator.

An example of a pump that may be used to introduce the concentrated disinfectant into the static mixer 28 is a six cubic centimeter diaphragm pump that may pump about 0.6 ml per pulse. In addition, water via line 34 may be introduced at about 40 psi, which is about 1,450 ml/minute. The activation of the pump 42 and the flow of water via line 34 is generally controlled by a switch 132 on the applicator 26, and schematically shown in FIG. 2. More specifically, the applicator 26 includes a switch 132 that is electrically connected to the pump 42. In addition, and as shown in FIG. 2, a solenoid valve 32 may be positioned between the water line 34 and static mixer 28 that is opened when the switch 132 is actuated. When an operator of the system 10 actuates the switch 132 on the applicator 26, the pump 42 delivers the concentrated chlorine dioxide to the static mixer 28 at the dilution station 22. In addition, the solenoid valve 32 is opened so that water is also delivered to the static mixer 28 to mix the water with the concentrated chlorine dioxide.

A fluid flow regulator 46 is preferably disposed between the solenoid valve 32 and the static mixer 28 to control a water flow rate into the static mixer 28 so that the chlorine dioxide solution is diluted to a predetermined concentration described above for delivery to the applicator applicators 26. For example, water may be introduced via line 34 at 40 psi, which is approximately 1.45 liters/minute.

Again in reference to FIG. 2, the dilution station 22 may include one or more check valves to control flow of the disinfectant solution. As shown, a first check valve 58 may be disposed between the solenoid valve 32 and the static mixer 28 to prevent backflow of the disinfectant into the water line 34. In addition, a second check valve 60 may be disposed between the outlet port 54 of the static mixer 28 and the applicator 26, and preferably adjacent to the static mixer 28, to prevent the flow of the disinfectant solution to the applicator 26 when the system 10 is not in use. Accordingly, the check valve 60 may be set to open only when the fluid pressure in the line 40A exceeds a predetermined pressure which is indicative of the disinfectant solution being delivered to the applicator 26 while in use.

Hand-Held Applicator

Figure 4:
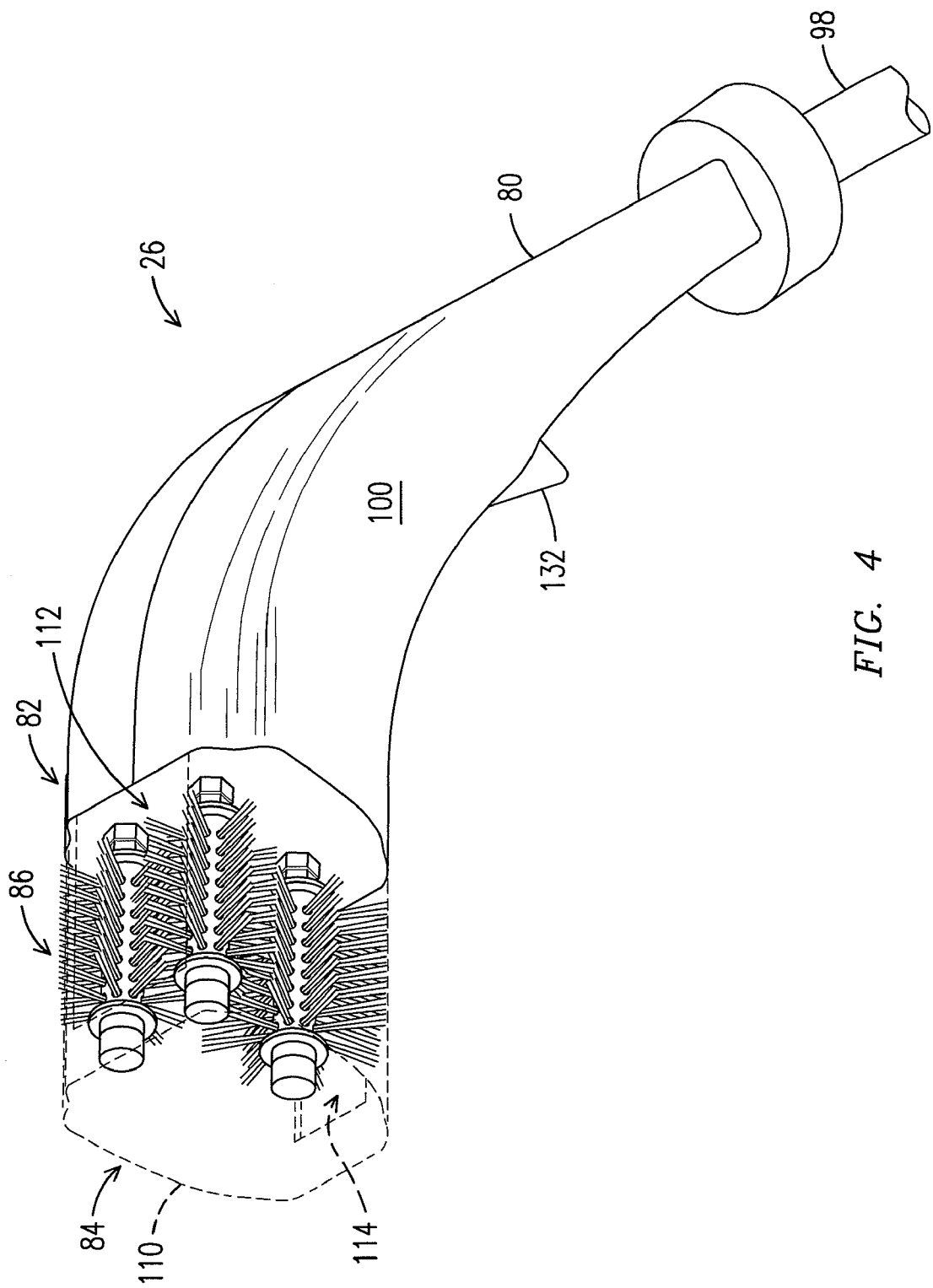
FIG. 4 is a perspective view of a hand-held applicator.
Figure 5:
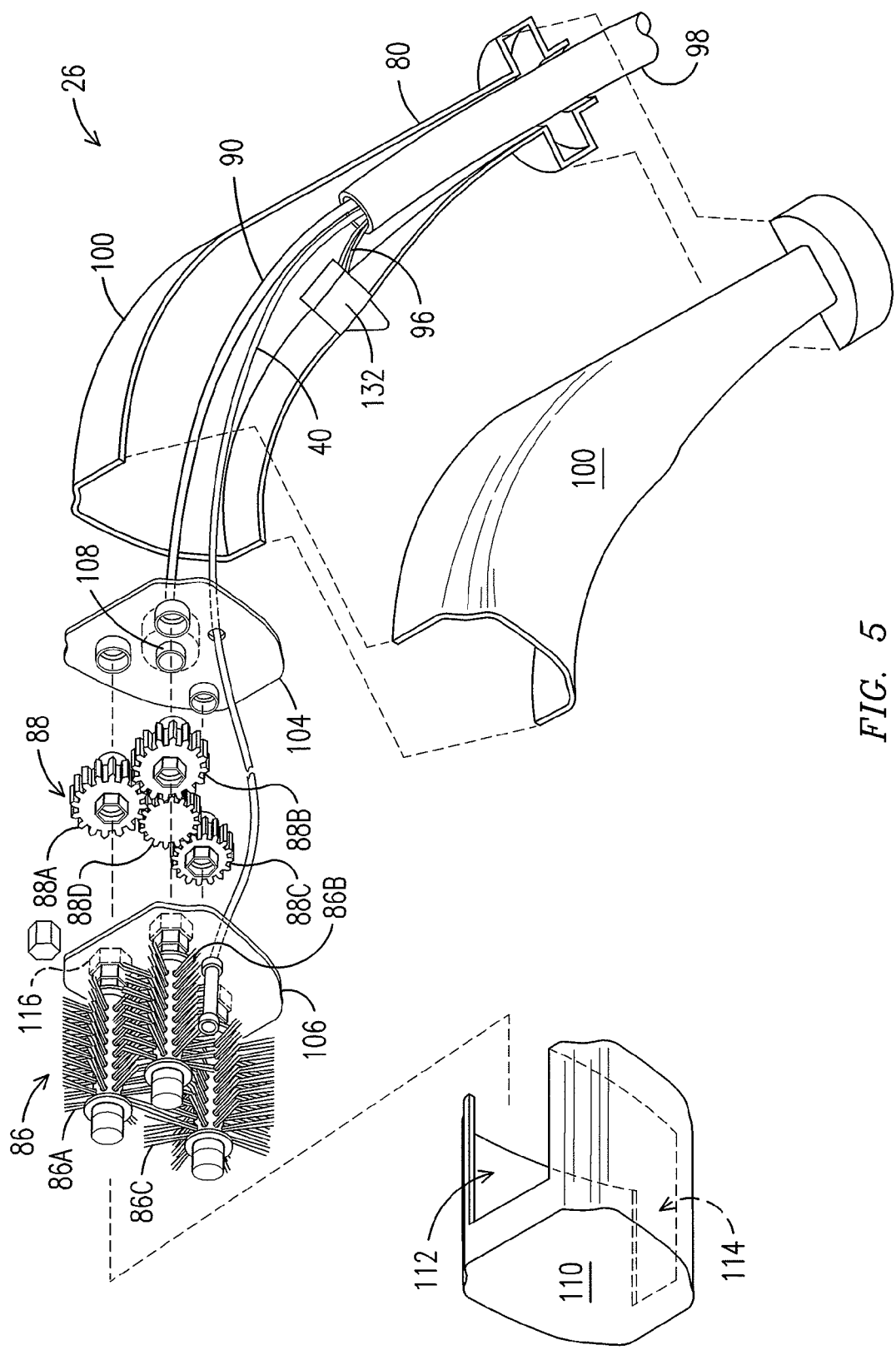
FIG. 5 is an exploded perspective view of the applicator of FIG. 4.

A disinfectant solution applicator 26 that may be used in embodiments of the invention is schematically shown in FIGS. 2, 4 and 5. One or more applicators 26 are positioned within the milking parlor 24 to clean and disinfect teats of a plurality of milk-producing animals such as cows that have been herded into the parlor 24 for milking. The applicator 26 includes a plurality of rotating brushes 86 that are operatively connected with a gear system including a plurality of gears 88 that are actuated by a drive shaft 90, which in turn is driven by a motor 138.

In an embodiment, at least one applicator 26 is provided in fluid and electrical communication with the above-described dilution station 22 from which the aqueous disinfectant is delivered. The applicator 26 is remotely positioned and operable relative to the dilution station 22, power source (not shown) and logic control board 130, so that an operator may hold and use the applicator 26 at various locations throughout the parlor 24. Accordingly, the system 10 and applicator 26 can be used with milking parlors of varying designs such as parallel, herringbone and rotating parlors.

Again with respect to FIG. 2, the applicator 26 is connected in fluid communication to the dilution station 22 by a flexible conduit/line 40 and in electrical communication by electrical lines 96 contained within a flexible and insulated jacket 98. The conduit/line 40 is preferably composed of neoprene or santoprene, having an inside diameter of about 0.17 inches. As shown in FIG. 2, the electrical lines 96 are connected to a logic board 130 that is programmed to control the activation of pump 42 and solenoid valve 32 for diluting the concentrated disinfectant at the diluting station 22 and delivery of the diluted disinfectant to the applicator 26. In addition, the logic board 130 is programmed to command the rotation of the brushes 86 coincident with delivery of the diluted disinfectant to the applicator.

In a preferred embodiment, the logic board 130 is programmed such that when the switch 132 is depressed or actuated the disinfectant is delivered from the dilution station 22 to a volume within applicator 26 occupied by the brushes 86. As long as the switch 132 is actuated, the disinfectant is delivered to the applicator 26 and the brushes 86, which are rotating. The logic board 130 is preferably programmed so that when the switch 132 is released, the solenoid valve 32 is closed and pump 42 is deactivated. However, the logic board 130 may be programmed with a delay so that brushes 86 continue to rotate for a predetermined time duration after the delivery of the disinfectant has been discontinued. In an embodiment, the time delay may be about 4 to about 7 seconds so that the rotating brushes 86 may be used to partially dry teats after the application of the disinfectant.

With respect to FIGS. 4 and 5, the components of the applicator 26 are illustrated in more detail. As shown, the applicator 26 includes a handle 80, a gear housing 82 and a brush housing 84. A shell casing 100 is configured at one end to form the handle 80 that houses the insulated jacket 98 with the flexible conduit/line 40 and electric lines 96, and a flexible drive shaft 90. As shown schematically in FIG. 2, the jacket 98 encasing the conduit 40 and electrical lines 96 are connected to an adapter 134 that is mounted to a housing 136 for a motor 138 that actuates the flexible drive shaft 90. The motor 138 may be a 24 volt DC brushless asynchronous motor that is in electrical communication with the logic board 130 via one of the electrical lines 96. The motor 138 is preferably driven at about 900 rpm so the brushes 86 rotated at preferably 500 rpm.

The flexible conduit 40, remaining electrical lines 96 and the drive shaft 90 extend through a flexible jacket 98 to the applicator 26. More specifically, these components are also housed in the handle 80 of the applicator 26, with the drive shaft terminating at the below-referenced gear housing 82 and the electrical lines 96 connected switch 132 and ground.

The shell casing 100 also forms in part the gear housing 82, which houses the gears 88 beginning at a point where the drive shaft 90 terminates. The drive shaft 90 extends through a first mounting plate 104 and is operatively connected to a central gear 88D, and is secured to the first mounting plate 104 with an adaptor 108. A second mounting plate 106 is secured in space relation to the first plate 104, wherein the shell casing 100, first mounting plate 104 and second mounting plate 106 define the gear housing 82.

In a preferred embodiment, the applicator 26 includes three brushes 86A, 86B and 86C wherein each such brush is operatively connected to a corresponding gear 88A, 88B and 88C. In addition, a central gear 88D is operatively connected to the drive shaft 90 as described above and each of the gears 88A, 88B and 88C to rotate the brushes 86A, 86B and 86C. A cover 110 is mounted to the second plate 106 forming the brush housing 84. The cover 110 includes a first opening 112 through which a teat of an animal is inserted for cleaning, and a second opening 114 that allows debris and fluid to escape from the brush housing 84 during a cleaning operation.

Figure 6:
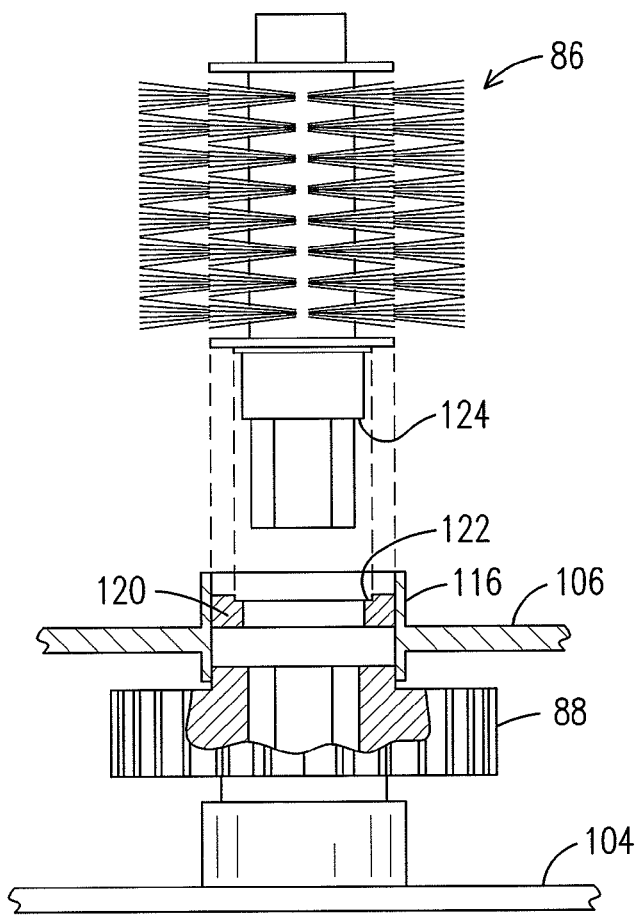
FIG. 6 is a sectional view of a brush and gear housing showing the brush/bearing interface and the brush/seal/gear interface.

With respect to FIG. 6 the interface of the gears 88 with the brushes 86 is represented by reference to a single brush 86 and gear 88, the second plate 106 includes hubs 116 through which a base 118 of a brush 86 is inserted for engagement with a corresponding gear 88. A bushing 120 is disposed within each hub 116 and includes a lip 122. In addition, the base 118 of each brush 86 includes a step 124 that fits in mating relationship with lip 122 on bushing 120. In this manner, the gear housing 82 and brush housing 84 are sealed from one another so that debris cleaned from teat is purged from the brush housing 84 and does not enter the gear housing 82 thereby fouling the components, namely the gears 88, in the gear housing 82 and bushing 120.

The gears 88A-88D and the bushings 120 are preferably composed of Hydex® 4101L, which is a polybutylene terephthalate plastic that has a relatively low coefficient of friction, and does not require lubricating materials. Prior art teat scrubbers typically use components that required lubricating materials. If debris enters the gear housing, the lubricating material captured the debris forming an abrasive amalgam that fouls the gear components.

Figure 8A:
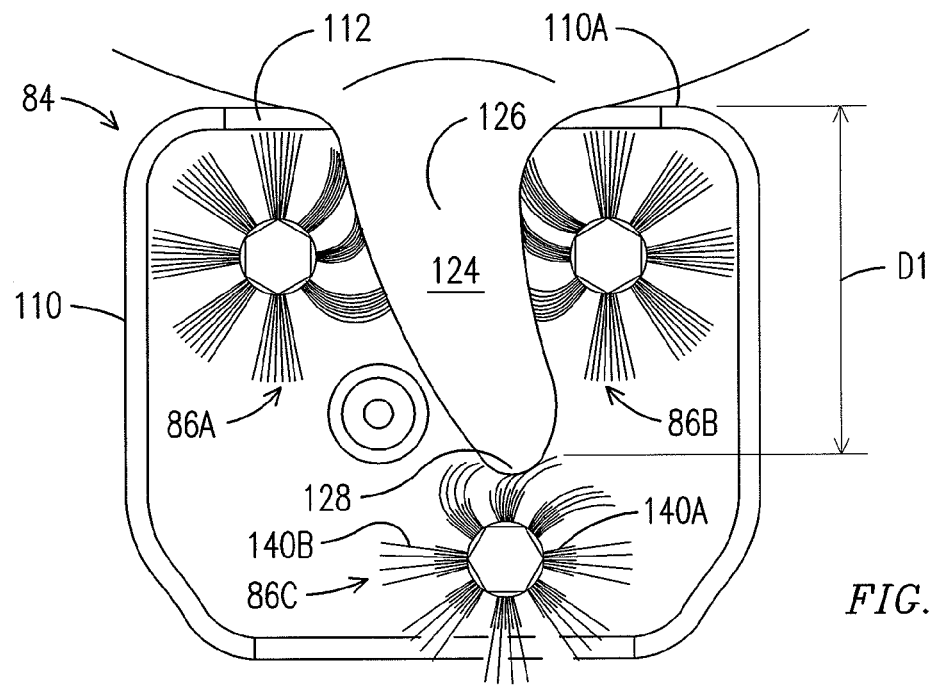
FIG. 8A is a schematic illustration of brushes in applicator including teat end brush for cleaning a shorter length teat.

With respect to FIG. 8A the arrangement of the brushes 86A, 86B and 86C are shown in more detail. As illustrated, a preferred embodiment includes two base brushes 86A and 86B that positioned side-by-side and adjacent to the first opening 112 of the cover 110. The brush 86C may also be referred to as a tip brush that is positioned relative to the other base brushes 86A and 86B, and relative to a teat of an animal to clean the tip of the teat. In an embodiment, the bristles on the brushes 86 are preferably nylon filaments having a diameter of 0.12 mm. The brushes 86 are preferably rotated at rotational speeds of about 400 rpm to about 700 rpm, and ideally rotated at a speed of about 500 rpm. Prior art applicators that include brushes utilize polypropylene filaments having diameter of 0.10 mm which provide a more coarse touch to a teat than bristles composed of nylon filaments. In addition, the prior art systems having polypropylene filament bristles are rotated at speeds of about 900 to about 1,000 rpm, which may adversely affect animal comfort during cleaning, which can affect the amount of milk produced during milking.

Figure 11:
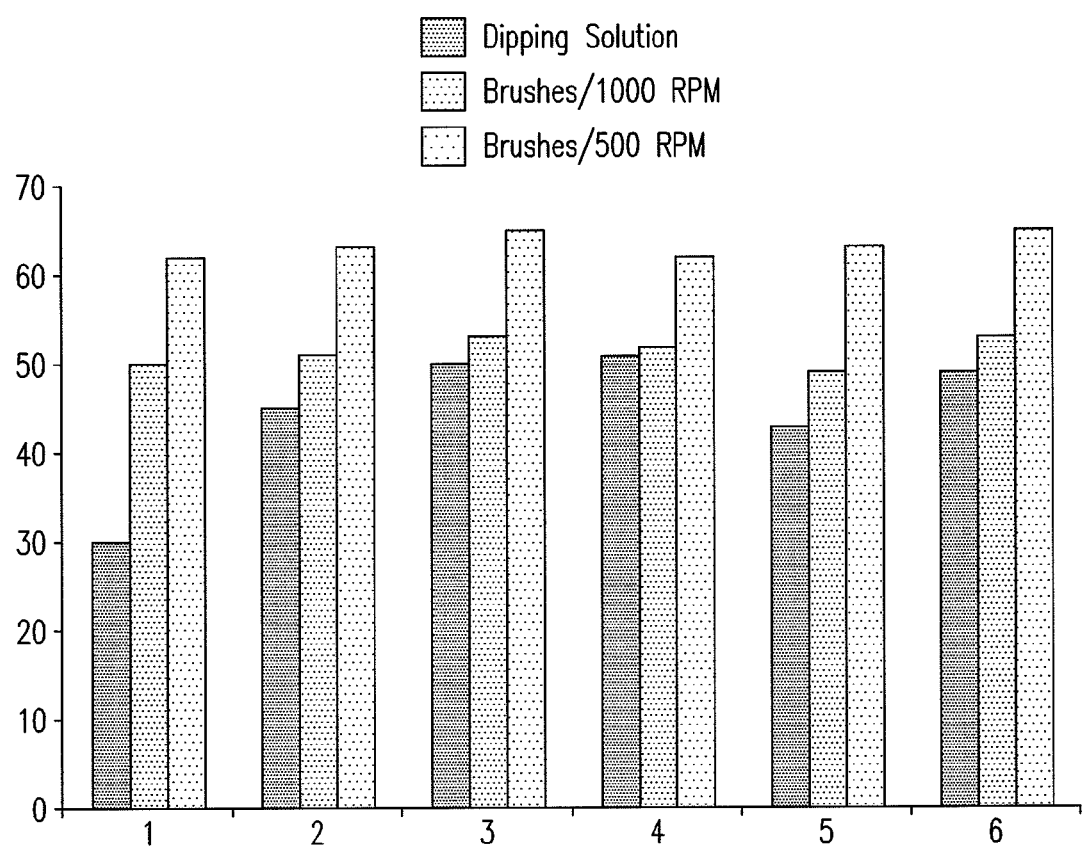
FIG. 11 is a bar graph comparing brushes with nylon bristles rotated at about 500 rpm compared to a dip cleaning operation and a cleaning operation with brushes having polypropylene bristles rotated at about 1,000 rpm.

With respect to FIG. 11 a bar graph illustrates the percentage of milk produced during the first two minutes of a milking using an iodine dipping solution and towel wiping for drying, a teat scrubbing unit with brushes rotating at 1,000 rpm and a teat scrubbing unit using brushes rotated at 500 rpm. The brushes rotated at 1,000 rpm were the prior art brushes including the polypropylene filament bristles. The brushes rotated at 500 rpm included the above-described nylon filament bristles. A disinfectant solution with a concentration of about 150 ppm aqueous chlorine dioxide (with moisturizing additives) and a 75 ppm aqueous chlorine solution (without additives) was used with the scrubbing unit having brushes rotated at 1,000 rpm. A 75 ppm aqueous chlorine dioxide solution (without additives) was used with the scrubbing unit having brushes rotated at 1,000 rpm. The data was taken from six different dairies each using the three different teat-cleaning techniques.

As shown, the brushes having the nylon filament bristles rotated at about 500 rpm produced more milk during the first two minutes of a milking operation. More specifically, the system produced on average about 63.33% of the total milk produced in a milking operation during the first two minutes of THE milking operation. An average of 51.33% of the total milk produced during a milking operation was produced during the first two minutes of a milking operation using the polypropylene filament brushes rotated about 1,000 rpm. An average of 44.67% of the total milk produced during a milking operation was produced during the first two minutes of a milking operation using the iodine dip and wiping the teats dry.

Average milking operations are about 4½ to 6 minutes with all teats being milked simultaneously; and, some dairies may have milking operation of less than 4 minutes. By producing more milk during the first two minutes of a milking operation, the total time of the milking operation can be reduced. In addition, cows that produce more milk during that first two minutes of a milking operation are more likely to "milk-out" completely, which is known to reduce the chances of mastitis. Moreover, more milk produced in the first two minutes of a milking operation is an indicator that the cleaning process is providing good quality stimulation to the teats.

In an embodiment, all of the brushes 86A, 86B and 86C have the same diameter. For example, the brushes 86A, 86B and 86C may have a diameter measured from an end of a bristle to the end of a diametrically opposed bristle of about 1.625 inches for cleaning the teats of a cow; however, the brush diameter may vary according to the size of diameter and/or length of the teat 126 inserted for cleaning and positioning of the brushes relative to one another.

Figure 7:
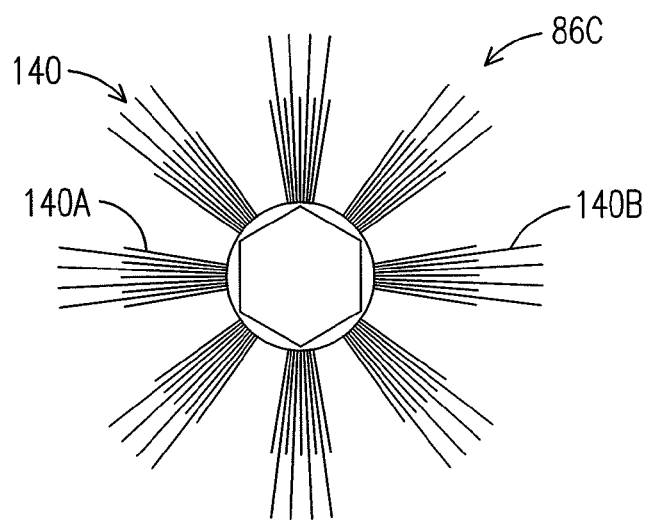
FIG. 7 is an end view of a teat end brush having filament bristles of multiple lengths.
Figure 8B:
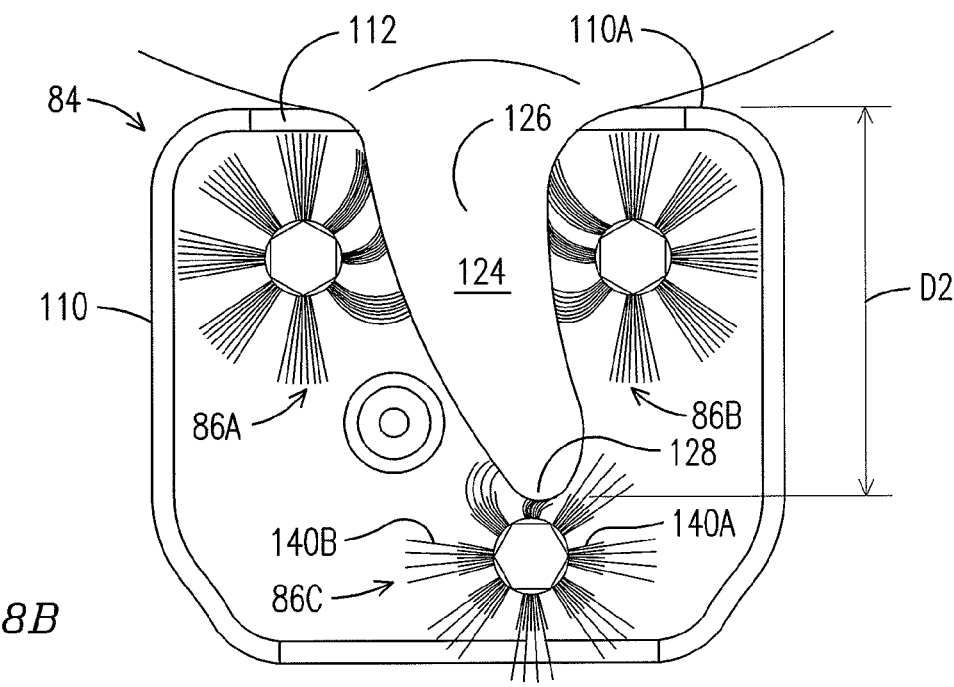
FIG. 8B is a schematic illustration of brushes in applicator including teat end brush for cleaning a longer length teat.

In reference to FIGS. 7, 8A and 8B, there is schematically illustrated another embodiment of the invention with the teat end brush 86C including bristles having multiple lengths, and the positioning of the teat end brush 86C relative to the barrel brushes 86A and 86B and a teat 124. Providing bristles of multiple lengths, the system 10 and the applicator may account for teats of varying lengths. By way of example, American bred cows have a teat length that is about 1.8 inches to about 1.9 inches, while teats of foreign bred cows may be longer.

In reference to FIG. 7, the teat end brush 86C includes bristles 140 for cleaning a teat, wherein the bristles 140 include a first of set of bristles 140A and a second set of bristles 140B. The first set of bristles 140A has a length that is shorter than the length of the second set of bristles 140B. As shown in FIG. 8A, a teat 124 is inserted into the brush housing 84 of the applicator 26 and between the barrel brushed 86A and 86B. The rotating barrel brushes 86A and 86B contact the teat base 126 and the teat end brush 86C engage the teat tip 128. More specifically, FIG. 8A shows the second set of (longer) bristles 140B engaging the tip 128 of a teat 124 having a shorter length; and in FIG. 8B, a teat tip 128 of a teat 124 having a longer length is engaged by the first set of bristles 140A having a shorter length relative to the second set of bristles 140B.

In order to accommodate different teat lengths, the tip brush 86 C is positioned in the brush housing 84 so that distance from an outside surface 110A of the cover 110 adjacent the opening 112 to the free ends of the bristles 140A and 140B varies. By way of example, the distance D1 shown in FIG. 8A from surface 110A to the free end of bristles 140B may be about 1.8 inches for shorter length teats; and, the distance D2 shown in FIG. 8B, from surface 110A to the free end of the bristles 140B may be about 2.2 inches for longer teat lengths. While bristles 140A and 140B are shown brushing against the teat 124, the distances D1 and D2 shown in FIGS. 8A and 8B respectively, are determined from the surface 110A to a free end of the bristles 140 when the bristles 140 are in a static position and not operational.

Method of Applying Disinfectant Solution

Figure 9:
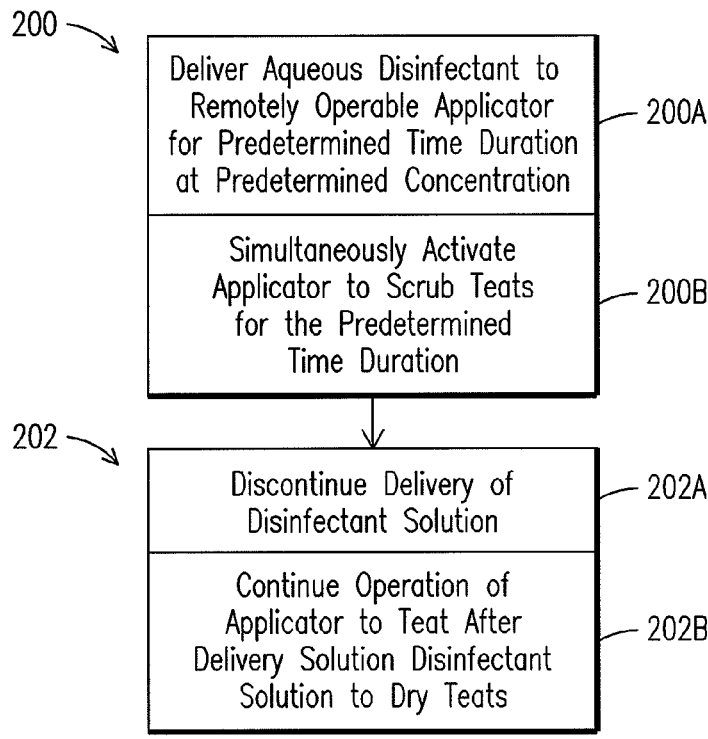
FIG. 9 is a flow chart including steps in a method or process for cleaning the teats of a milk-producing animal.

Steps in application of a disinfectant solution are set forth in flowchart shown in FIG. 9. In step 200, two operations take place including step 200A in which delivery of the aqueous disinfectant solution to the applicator takes place for a predetermined time duration. In step 200B the applicator is simultaneously activated to scrub the teats for the predetermined time duration while the disinfectant solution is delivered. As described above, the actuation of the switch 132 initiates command or electrical signals that result in the solenoid valve 32 opening and activation of pump 42, so water (via line 34) and concentrated disinfectant solution (via line 28 from activation system 20) respectively flows through mixer 28 and to the applicator 26.

Actuation of the switch 132 also transmits signals causing the brushes 86 to rotate so a teat 124 is scrubbed as the disinfectant solution is delivered to the brush housing 84. Milk producing animals, such as cows, have four teats. The cleaning operation preferably takes place from the rear or side of the cow, and begins with the teat are furthest away and moves in a clockwise or counter-clockwise direction. The solution is delivered to the rotating brushes 86 as long as the switch 132 is actuated. The solution may be delivered for a first time duration of about 5 to 8 seconds when the brushes are rotating. The applicator 26 is preferably reciprocated in an up-down and twisting motion during application of the solution to adequately clean the teat.

As previously indicated the solution is an aqueous chlorine dioxide solution having a concentration of about 150 ppm and delivered to the brushes 86 at a flow rate of about 40 psi, or about 1.45 L/min. The brushes 86 are preferably composed of nylon bristles and rotate at a speed of about 500 rpm to about 520 rpm.

After all teats have been scrubbed and are free of visible soil, the switch 132 is released which discontinues or stops the delivery of the disinfectant solution to the applicator 26, which is set forth in step 202A. However, the logic control 130 is programmed with a time delay so the brushes 86 continue to rotate for a second predetermined time duration as the brushes 86 remain in contact with the teat, as described in step 202B. The brushes 86 may continue to rotate for a sufficient time, i.e. 4 to 7 seconds to dry the teats. This second time duration is preferably of a length so that the teat is not entirely dried of the solution and some solution residue may remain on the teat to further disinfect the teat. After a teat has been cleaned and dried the applicator 26 is moved to the next teat. By beginning with teats that are positioned farthest away and moving in a clockwise or counterclockwise direction, cross contamination may be avoided. The disinfectant solution is then in contact with skin on the teat for 60 to 120 seconds, because the solution does not contain any conditioning compounds the solution sublimes prior to attachment of a milking machine.

While certain embodiments of the present invention have been shown and described herein, such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A system for cleaning teats of milk-producing animals, wherein the animals are housed in a parlor area and the teats are cleaned or disinfected before a milking operation is started, the system comprising:
    a disinfectant solution source provided at the parlor area;
    a hand-held applicator having a housing volume within which one or more scrubbing elements are positioned for engaging a teat of the milk-producing animal having been inserted in the volume for cleaning;
    a delivery station, comprising at least a pump and a conduit in fluid communication with the hand-held applicator and the disinfectant solution source, for delivering the disinfectant solution to the housing volume of the hand-held applicator with a predetermined concentration of chlorine dioxide;
    a motor operatively connected to the scrubbing elements to actuate the scrubbing elements;
    a controller, in electrical communication with the hand-held applicator, the motor and the delivery station, that is configured to initiate the actuation of the scrubbing elements and delivery of the disinfectant solution to the hand-held applicator as the scrubbing elements are actuated; and,
    wherein the hand-held applicator is remotely operable relative to the disinfectant solution source, and the disinfectant solution is delivered to the hand-held applicator and applied to the teats in a non-foaming aqueous form having a viscosity and/or vapor pressure that is substantially equal to that of water.

2. The system of claim 1 wherein the disinfectant solution delivered to the hand-held applicator contains about 100 ppm to 200 ppm by volume of chlorine dioxide.

3. The system of claim 2 wherein the disinfectant solution delivered to the hand-held applicator contains about 150 ppm by volume of chlorine dioxide.

4. The system of claim 1 wherein the scrubbing elements include a rotatable brush disposed in the housing for engaging an end of the teat through which milk is released, and the brush includes an array of bristles including a first set of bristles having a first length and a second set of bristles that have a second length that is longer than the first length.

5. The system of claim 4 wherein scrubbing elements comprise a plurality of rotatable brushes including the first brush and at least one second brush that engages an area of the teat above the teat end for teat of the milk-producing animal having been inserted in the housing volume for cleaning, and each of the brushes includes nylon bristles and the brushes are rotated at a rotational speed from about 400 rpm to about 700 rpm.

6. A system for cleaning teats of milk-producing animals, wherein the animals are housed in a parlor area and the teats are cleaned or disinfected before a milking operation is started, the system comprising:
    an aqueous chlorine dioxide disinfectant solution source provided at the parlor area, wherein the disinfectant solution has a viscosity and/or vapor pressure substantially equal to water;
    a hand-held applicator having a housing volume within which one or more scrubbing elements are positioned for engaging a teat of the milk-producing animal having been inserted in the volume for cleaning;
    a delivery station in fluid communication with the hand-held applicator and the disinfectant solution source, for delivering the disinfectant solution to the housing volume of the hand-held applicator with a predetermined concentration of chlorine dioxide;
    a controller, in electrical communication with the hand-held applicator and the delivery station, that is configured to initiate the actuation of the scrubbing elements and delivery of the disinfectant solution to the hand-held applicator as the scrubbing elements are actuated; and,
    wherein the hand-held applicator is remotely operable relative to the disinfectant solution source; and,
    wherein the one or more scrubbing elements includes at least two rotatable brushes disposed with the housing of the hand-held applicator wherein a first brush is positioned in the housing for engaging an end of the teat through which milk is released, and a second brush is positioned in the housing to engage an area of the teat above the end of the teat, and the first and second brushes comprise an array of nylon fibers and the brushes are rotated at a rotational speed from between about 400 rpm to about 700 rpm.

7. The system of claim 6 wherein the brushes are rotated at a rotational speed of about 500 rpm to about 550 rpm.

8. A system for cleaning teats of milk-producing animals, wherein the animals are housed in a parlor area and the teats are cleaned or disinfected before a milking operation is started, the system comprising:
    an aqueous chlorine dioxide disinfectant solution source provided at the parlor area, wherein the disinfectant solution, when applied to the teats of an animal, has a viscosity and/or vapor pressure substantially equal to water;
    a hand-held applicator having a housing volume within which one or more scrubbing elements are positioned for engaging a teat of the milk-producing animal having been inserted in the volume for cleaning;
    a delivery station in fluid communication with the hand-held applicator and the disinfectant solution source, for delivering the disinfectant solution to the housing volume of the hand-held applicator with a predetermined concentration of chlorine dioxide;
    a controller, in electrical communication with the hand-held applicator and the delivery station, that is configured to initiate the actuation of the scrubbing elements and delivery of the disinfectant solution to the hand-held applicator as the scrubbing elements are actuated; and, wherein the hand-held applicator is remotely operable relative to the disinfectant solution source; and, wherein the scrubbing elements include a rotatable brush disposed in the housing for engaging an end of the teat through which milk is released, and the brush includes an array of bristles including a first set of bristles having a first length and a second set of bristles that have a second length that is longer than the first length.

9. A system for cleaning teats of milk-producing animals, wherein the animals are housed in a parlor area and the teats are cleaned or disinfected before a milking operation is started, the system comprising:

an aqueous chlorine dioxide disinfectant solution source provided at the parlor area, wherein the disinfectant solution, when applied to the teats of an animal, has a viscosity and/or vapor pressure substantially equal to water;

a hand-held applicator having a housing volume within which one or more scrubbing elements are positioned for engaging a teat of the milk-producing animal having been inserted in the volume for cleaning;

a delivery station in fluid communication with the hand-held applicator and the disinfectant solution source, for delivering the disinfectant solution to the housing volume of the hand-held applicator with a predetermined concentration of chlorine dioxide;

a controller, in electrical communication with the hand-held applicator and the delivery station, that is configured to initiate the actuation of the scrubbing elements and delivery of the disinfectant solution to the hand-held applicator as the scrubbing elements are actuated; and, wherein the hand-held applicator is remotely operable relative to the disinfectant solution source; and, wherein the scrubbing elements include a rotatable brush disposed in the housing for engaging an end of the teat through which milk is released, and the brush includes an array of bristles including a first set of bristles wherein each bristle has a free end that is positioned in the housing a first distance from an outside surface of the housing adjacent to an opening through which the teat is inserted and a second set of bristles wherein each bristle has a free end that is positioned in the housing a second distance from the outside surface of the housing and the first distance is greater than the second distance.

10. A system for cleaning teats of milk-producing animals, wherein the animals are housed in a parlor area and the teats are cleaned or disinfected before a milking operation is started, the system comprising:

an aqueous chlorine dioxide disinfectant solution source provided at the parlor area, wherein the disinfectant solution, when applied to the teats of an animal, has a viscosity and/or vapor pressure substantially equal to water;

a hand-held applicator having a housing volume within which one or more scrubbing elements are positioned for engaging a teat of the milk-producing animal having been inserted in the volume for cleaning;

a delivery station in fluid communication with the hand-held applicator and the disinfectant solution source, for delivering the disinfectant solution to the housing volume of the hand-held applicator with a predetermined concentration of chlorine dioxide;

a controller, in electrical communication with the hand-held applicator and the delivery station, that is configured to initiate the actuation of the scrubbing elements and delivery of the disinfectant solution to the hand-held applicator as the scrubbing elements are actuated; and, wherein the hand-held applicator is remotely operable relative to the disinfectant solution source; and, the disinfectant solution source comprising an aqueous concentrated chlorite salt solution and a citric acid solution, wherein the chlorite salt solution contains about 32,000 ppm by volume of a chlorite salt, and the citric acid solution has a 50% molar concentration of citric acid in water, and the system further comprises:

an activation system, in fluid communication with the hand-held applicator, that mixes the citric acid with the chlorite salt solution at a predetermined ratio to form a concentrated chlorine dioxide solution having a concentration of about 3,200 ppm to about 9,600 ppm of chlorine dioxide;

the delivery station including a dilution station, in fluid communication between the hand-held applicator and the activation system and in electrical communication with the controller, whereupon command from the controller the concentrated chlorine dioxide solution is diluted to a predetermined concentration of chlorine dioxide delivered to the hand-held applicator.

11. The system of claim 10 wherein the dilution station comprises:

a static mixer in fluid communication with a water source, the activation system and the hand-held applicator;

a pump disposed between the static mixer and the activation system, and the pump is in electrical communication with the controller, whereupon command from the controller, pumps the concentrated chlorine dioxide at a predetermined flow rate from the activation system to the static mixer;

a valve, disposed between the water source and the static mixer, that is in electrical communication with the controller and is opened upon command from the controller when the pump is commanded to pump the concentrated chlorine dioxide from the activation system to the static mixer;

a regulator disposed between the static mixer and the water source for controlling the flow rate of the water to the static mixer for diluting the concentrated chlorine dioxide to the predetermined concentration; and, wherein the disinfectant solution is delivered at the predetermined concentration to the hand-held applicator upon activation of the pump and opening of the valve.

12. A system for cleaning teats of multiple milk-producing animals, wherein the animals are housed in a parlor area and the teats are cleaned or disinfected before a milking operation is started, the system comprising:

an aqueous chlorine dioxide disinfectant solution source provided at the parlor area;

a hand-held applicator having a housing volume within which a plurality of rotatable brushes are positioned for engaging a teat of the milk-producing animal having been inserted in the housing volume for cleaning;

a delivery station in fluid communication with the hand-held applicator and the disinfectant solution source, for delivering the disinfectant solution to the housing volume of the hand-held applicator with a predetermined concentration of an active disinfectant compound in the disinfectant solution;

a controller, in electrical communication with the hand-held applicator and the delivery station, that is configured to simultaneously initiate the rotations of the brushes and delivery of the disinfectant solution to the hand-held applicator; and, wherein the hand-held applicator is remotely operable relative to the disinfectant solution source and at least one first brush engages an end of the teat through which milk is released and the at least one first brush includes an array of bristles including a first set of bristles having a first radial length and a second set of bristles having a second radial length that is longer than the first radial length.

13. The system of claim 12 wherein the brushes comprise at least one second brush that engages an area of the teat above the end of the teat engaged by the at least one first brush.

14. The system of claim 13 wherein the bristles on the first and second brushes are composed of nylon fibers and the brushes are rotated at a rotational speed of up to about 900 rpm for cleaning a teat.

15. The system of claim 12 wherein the predetermined concentration of chlorine dioxide in the solution delivered to the hand-held application is about 100 ppm to about 200 ppm by volume.

16. The system of claim 12 wherein the predetermined concentration of chlorine dioxide in the solution delivered to the hand-held application is about 150 ppm by volume.

17. A method for cleaning teats of multiple milk-producing animals during a milking operation, wherein the animals are housed in a parlor area and the teats are cleaned or disinfected before the milking operation is started, the method comprising:

providing a source of an aqueous chlorine dioxide disinfectant solution at a location within or at the parlor;

delivering, for a first predetermined time duration, the aqueous chlorine dioxide disinfectant solution containing a predetermined concentration of about 150 ppm to about 200 ppm of chlorine dioxide by volume to a housing of an hand-held applicator having a teat inserted within a volume of the housing and the applicator having movable scrubbing elements in the housing element;

simultaneously actuating the scrubbing elements for cleaning the teats in the presence of the solution for the predetermined time duration, wherein the applicator is remotely operable relative to the solution source; and, wherein the scrubbing elements include a rotatable brush disposed in the housing for engaging an end of the teat through which milk is released, and the brush includes an array of bristles including a first set of bristles having a first length and a second set of bristles that have a second length that is longer than the first length.

18. The method of claim 17 wherein the step of providing the source of the disinfectant solution comprises providing the solution with chlorine dioxide at a higher concentration than as delivered to the hand-held applicator, and diluting the disinfectant solution to the predetermined concentration before the solution is delivered to the hand-held applicator.

19. A method for cleaning teats of multiple milk-producing animals, wherein the animals are housed in a parlor area and the teats are cleaned or disinfected before a milking operation is started, the method comprising:

providing a source of an aqueous chlorine dioxide disinfectant solution at a location within or at the parlor by providing the solution with chlorine dioxide at a higher concentration than as delivered to the hand-held applicator, and diluting the disinfectant solution to the predetermined concentration before the solution is delivered hand-held applicator;

delivering, for a first time duration, the aqueous chlorine dioxide disinfectant solution containing a predetermined concentration of about 150 ppm to about 200 ppm of chlorine dioxide by volume to a housing of a hand-held applicator having a teat inserted within a volume of the housing and the applicator having movable scrubbing elements in the housing volume; and, simultaneously actuating the scrubbing elements for cleaning the teats in the presence of the disinfectant solution for the first time duration, wherein the applicator is remotely operable relative to the solution source;

providing control logic in electrical communication with a motor that drives the scrubbing elements, in electrical communication with a pump that is in fluid communication with the solution source and in electrical communication with a valve, which is in fluid communication with a water source; and, wherein the control logic is configured to simultaneously activate the motor, activate the pump and open the valve to dilute the concentrated solution to the predetermined concentration, deliver the solution at the predetermined concentration of chlorine dioxide and actuate the scrubbing elements for the first predetermined time duration.

20. A method for cleaning teats of multiple milk-producing animals prior to a milking operation, wherein the animals are housed in a parlor area and the teats are cleaned or disinfected before the milking operation is started, the method comprising:

providing a source of an aqueous chlorine dioxide disinfectant solution at a location within or at the parlor;

delivering, for a first time duration, the aqueous chlorine dioxide disinfectant solution containing a predetermined concentration of about 150 ppm to about 200 ppm of chlorine dioxide by volume to a housing of a hand-held applicator having a teat inserted within a volume of the housing and the applicator having movable scrubbing elements in the housing volume; and, simultaneously actuating the scrubbing elements for cleaning the teats in the presence of the solution for the first time duration, wherein the applicator is remotely operable relative to the solution source;

actuating the scrubbing elements for a second time duration after the first time duration has elapsed in order to dry the teats.

21. The method of claim 20 wherein the second time duration is of a sufficient length of time so that some residual solution remains on the teat.

22. The method of claim 20 wherein a residual amount of disinfectant solution remains on the teat after the second time duration elapses.

* * * * *